(12) United States Patent
Goyal et al.

(10) Patent No.: US 7,376,724 B2
(45) Date of Patent: May 20, 2008

(54) DYNAMIC RECONFIGURATION OF NODES IN A CLUSTER FILE SYSTEM

(75) Inventors: Neeraj Goyal, Santa Clara, CA (US); Suchit Kaura, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 914 days.

(21) Appl. No.: 10/448,889

(22) Filed: May 30, 2003

(65) Prior Publication Data

US 2004/0243673 A1 Dec. 2, 2004

(51) Int. Cl.
*G06F 15/173* (2006.01)
(52) U.S. Cl. .................. 709/223; 709/224; 709/219; 709/220
(58) Field of Classification Search ............. 709/201, 709/209, 219–220, 223–224, 226; 707/8, 707/10; 714/4
See application file for complete search history.

(56) References Cited

U.S. PATENT DOCUMENTS

| 5,999,712 | A  | * | 12/1999 | Moiin et al. ............. 709/220 |
| 6,014,669 | A  | * | 1/2000  | Slaughter et al. .......... 707/10 |
| 6,748,429 | B1 | * | 6/2004  | Talluri et al. ............ 709/221 |
| 7,039,694 | B2 | * | 5/2006  | Kampe et al. ............ 709/222 |

* cited by examiner

*Primary Examiner*—LaShonda T Jacobs
(74) *Attorney, Agent, or Firm*—Hickman Palermo Truong & Becker LLP

(57) ABSTRACT

Approaches are disclosed for reconfiguring nodes in a cluster file system after new nodes are added to the cluster file system or when node configuration data is changed. According to one aspect of the invention, counters and node configuration data is stored on a volume in a cluster file system. Nodes periodically inspect the counters, and, if it is determined that a node has been added to the cluster file system, or, if the node determines that node configuration data for a node has changed, the node (and other nodes) may dynamically reconfigure itself.

63 Claims, 8 Drawing Sheets

… … … … … … … … …

DYNAMIC RECONFIGURATION OF NODES IN A CLUSTER FILE SYSTEM

FIELD OF INVENTION

The invention generally relates to computer systems, and, more specifically, relates to approaches for configuring nodes in cluster file systems.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art, merely by inclusion in this section.

A cluster may be defined as a group of components, such as PCs or workstations, that work cooperatively together in some fashion. A cluster file system is a kernel mode component, which resides on each member of the cluster and allows shared access to files on storage in some fashion to all the members of cluster. Most contemporary implementations of clusters use a manual method for adding nodes to the cluster. Manually configuring a new node requires at least two steps, which include: (1) manually booting the new node using a boot node command, and (2) once the new node is booted, once again starting the node installation program to force each node to read all the node configuration data of the new node. In some circumstances, the volume must be taken offline during manual configuration.

The problem of adding a node to a cluster becomes even more aggravated in a cluster file system, because the cluster file system is typically integrated with the operating system, and, therefore, there is little infrastructure upon which to build mechanisms to set up and manage a cluster file system.

As stated above, in cluster file systems, manual configuration of nodes is required when a node is added to the system. The manual changes need to be made not only on the node being added, but also on the nodes already part of the cluster. Some of the cluster file systems also require taking volumes offline before this kind of an operation is permitted.

It would be desirable to have a configuration mechanism that avoids the aforementioned problems.

BRIEF DESCRIPTION OF THE FIGURES

The disclosed subject matter is depicted by way of representative examples, and not by way of limitation, in the illustrations of the accompanying figures. The figures include.

DETAILED DESCRIPTION OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are disclosed for reconfiguring nodes in a cluster file system after new nodes are added to the cluster file system or when the configuration of a node is changed. According to one aspect of the invention, counters and node configuration data is stored in a configuration repository, such as a configuration table and/or publish sectors on a volume in a cluster file system. The counters are incremented when nodes are added to the cluster file system or when the configuration of a node is changed. Nodes periodically inspect the counters on the volume to identify when new nodes have been added or the configuration of a node has been changed. If a node determines that a new node has been added to the cluster file system, or, if the node determines that the configuration of a node has changed, then the node that inspected the counter (and other nodes) may dynamically reconfigure itself.

Exemplary System

Figure 1:
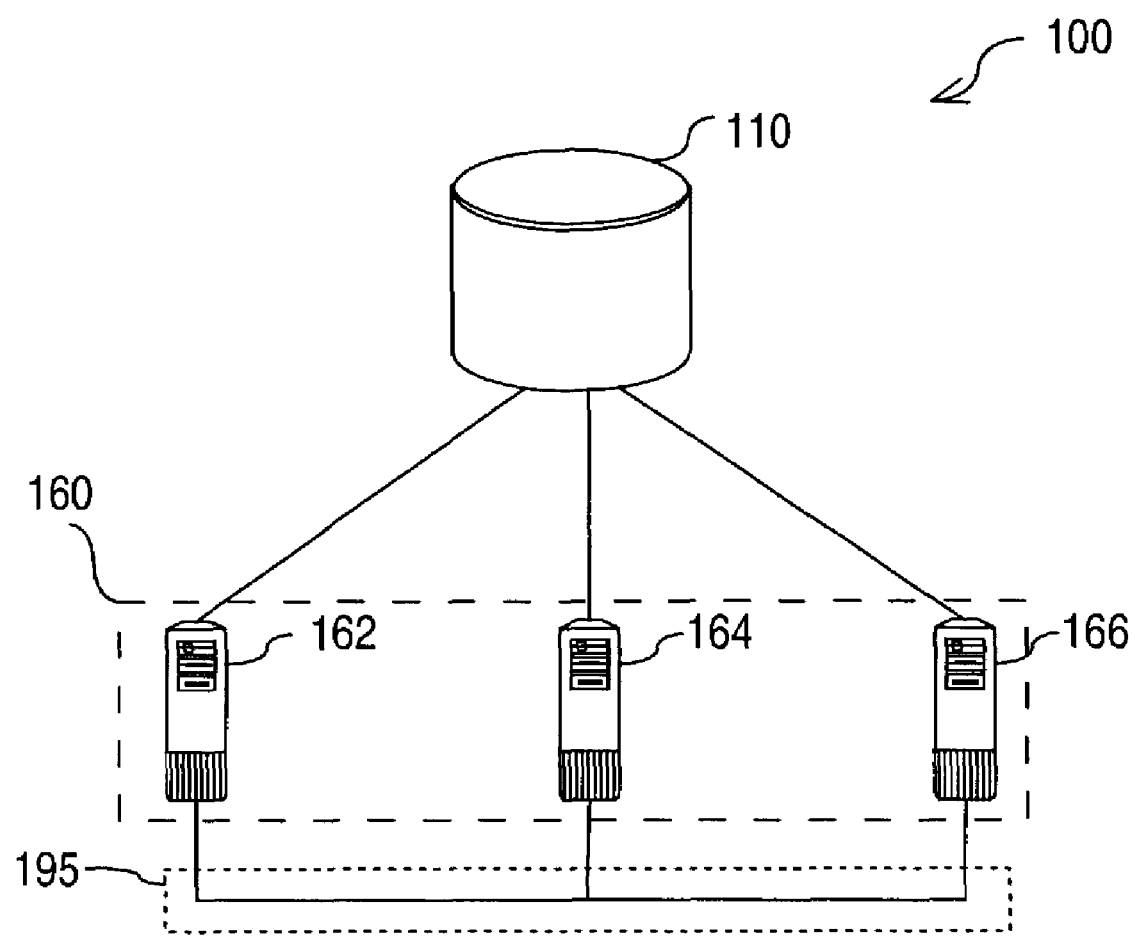
FIG. 1 is a block diagram depicting an embodiment of a cluster file system.
Figure 2:
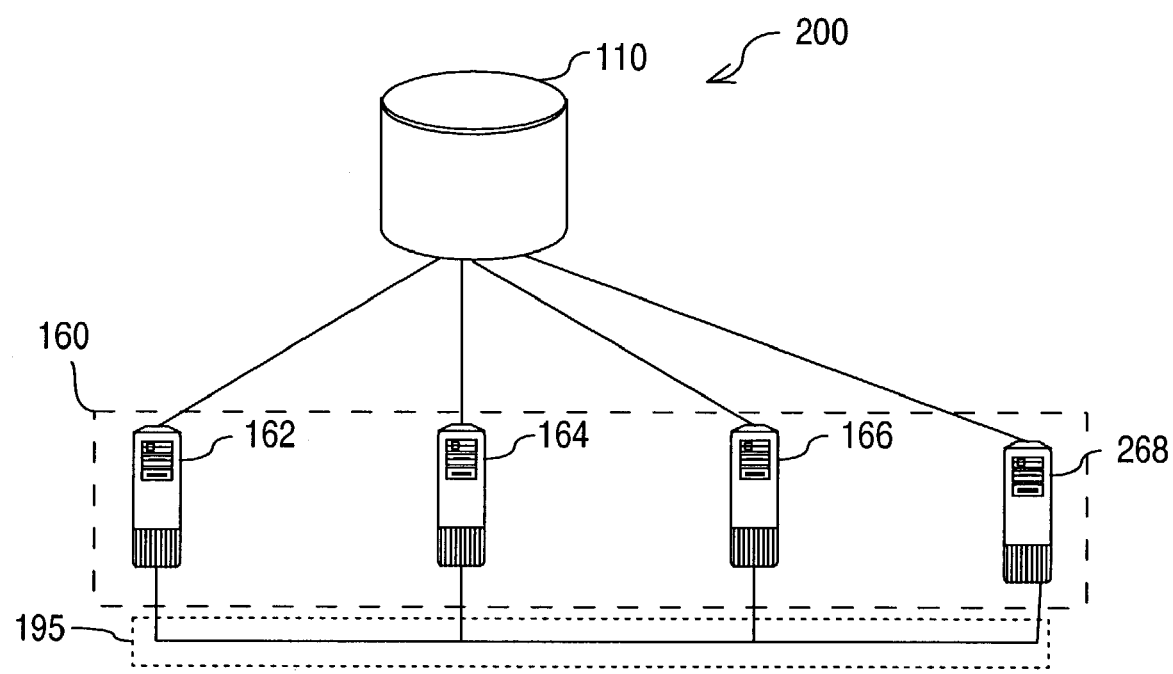
FIG. 2 is a block diagram depicting the embodiment of the cluster file system of FIG. 1, with the addition of a new node.
Figure 3:
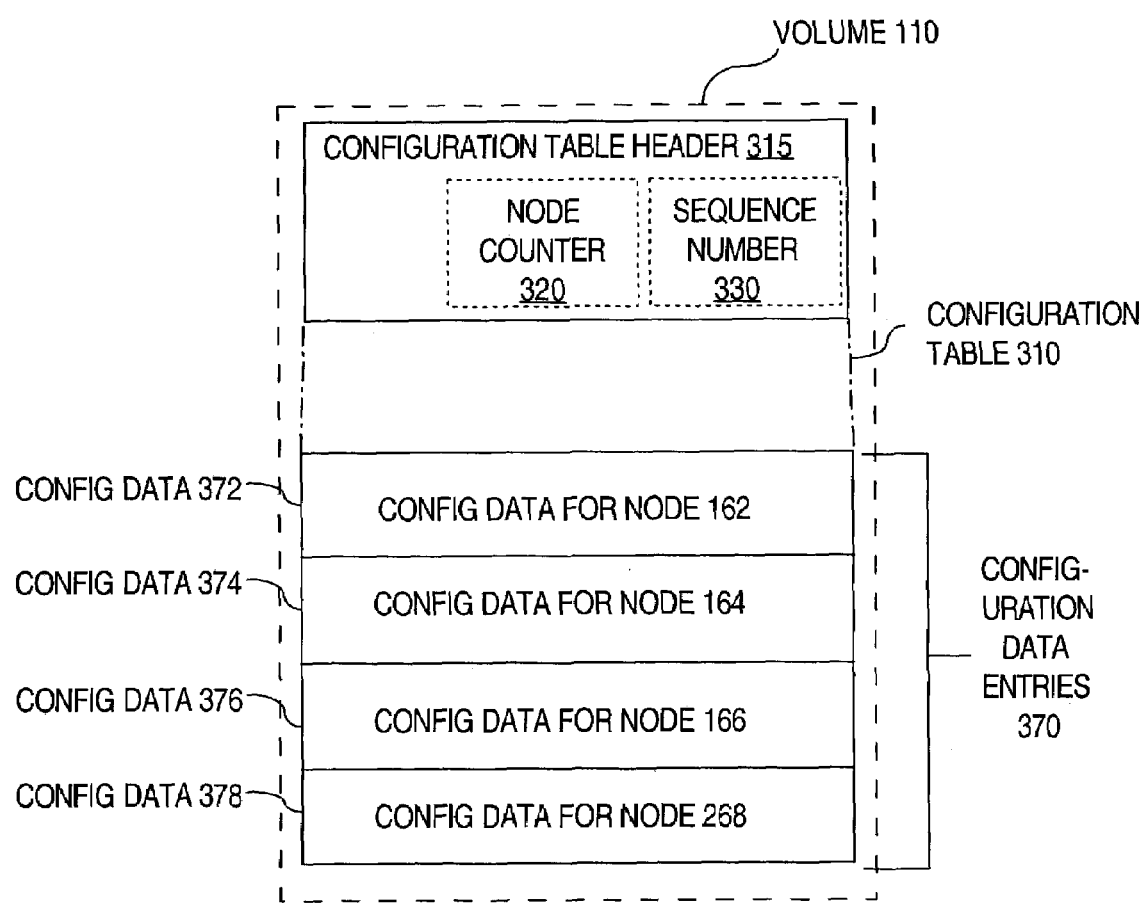
FIG. 3 is a table depicting an embodiment of a configuration repository.

FIGS. 1-3 describe structural components that are used to implement methods and combinations of methods (see FIGS. 4-6) for reconfiguring nodes in a cluster file system after new nodes are added to the cluster file system or when the configuration of a node is changed.

More specifically, FIG. 1 is a block diagram depicting a cluster file system 100. Cluster file system 100 includes any number of nodes 160. In the embodiment of FIG. 1, cluster file system 100 includes three nodes 160, namely, node 162, node 164 and node 166. Each of nodes 160 is connected to volume 110. Nodes 160 may communicate with one another via interconnect(s) 195.

FIG. 2 is a block diagram depicting the embodiment of FIG. 1 with the addition of new node 268. Because new node 268 is added, the configuration of nodes 160 is changed. Therefore, nodes 160 must be reconfigured to reflect the addition of new node 268 to cluster file system 200.

FIG. 3 is a table depicting a configuration repository. The configuration repository resides on a medium accessible by all nodes 160. In an embodiment, the configuration repository is in the form of a table, namely, configuration table 310, which resides on volume 110. Configuration table 310 includes configuration table header 315. Configuration table header 315 includes node counter 320 and sequence number 330, which are used in determining when nodes should be reconfigured. As is described in further detail below, node counter 320 is monitored by nodes 160 to determine whether any new node has been added to cluster file system 100. In addition, nodes 160 monitor sequence number 330 to determine whether the configuration of any other of nodes 160 has been changed.

Configuration table 310 also includes configuration data entries 370. Configuration data entries 370 store information concerning the configuration of nodes 160 in cluster file system 100. Configuration data entries 370 include configuration information such as node name, the IP address, port information, number of communication interfaces, communication protocol, and other information regarding the specific node 160. Configuration data entries 370 (i.e. configuration data entries 372, 374, 376, and 378) also determine the node number on the volume for the nodes 160 based on their position in configuration table 310.

Publish sectors also store information indicating whether the node 160 that is associated with the publish sector 160 is alive or dead. Internal files for volume metadata management may also be included on volume 110.

Figure 4:
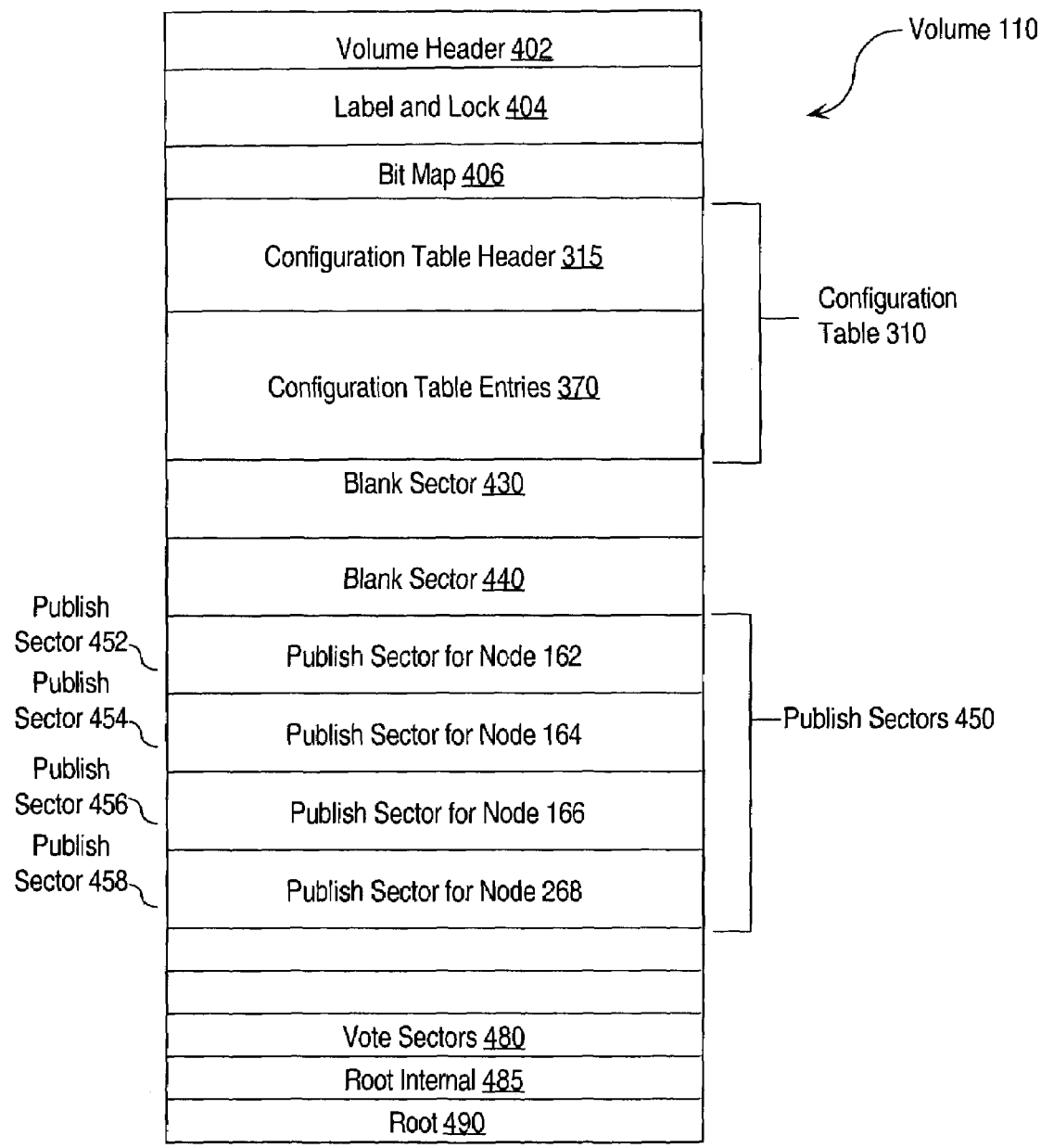
FIG. 4 is a table depicting an embodiment of a volume.

FIG. 4 is a table depicting volume 110. Configuration table 310, which was described above, resides on volume 110. Volume 110 also includes volume header 402, label and lock 404, and bit map 406.

In an embodiment, blank sectors 430 and 440 are adjacent to configuration table 310. This position of blank sectors 430 and 440 facilitates simultaneous reading of configuration table 310 and blank sectors 430 and 440. In embodiments, blank sectors 430 and 440 may be used to carry out various utility functions.

Volume 110 also includes publish sectors 450. Each publish sector 450 is associated with a particular node 160. For example, publish sector 452 is associated with node 162. Similarly, publish sectors 454, 456 and 458 are respectively associated with nodes 164, 166 and 268.

A publish sector 450 is used to store configuration information about the node 160 with which the particular publish sector 450 is associated. The publish sector of a node 160 is referenced using the relative position of the entry of the node 160 among the configuration data entries 370, which lie in configuration table 310. For example, for a node 160 that is associated with the first configuration data entry 370 (i.e., configuration data entry 372), the publish sector 450 that is associated with the node will be the first publish sector (i.e., publish sector 452). Similarly, configuration data for a second node will be stored in configuration data entry 374, and, publish sector 454 publish sector 454 will be associated with the second node. The publish sector 450 will be used to store information regarding the specific node 160, such as, whether the specific node 160 is alive or dead.

When new node 268 is added to a cluster file system, new node 268 will examine a number of sectors on volume 110. For example, new node 268 may read configuration table header 315, configuration table entries 370, blank sectors 430 and 440, and a number of publish sectors 450. New node 268 examines configuration table entries 370 to determine if new node 268 is already in configuration table 310. If new node 268 is already in configuration table 310, it is not necessary to add new node 268 to configuration table 310. However, in embodiments, if the configuration of new node 268 has changed, the configuration data in the configuration table entry 370 and the publish sector 450 associated with new node 268 may be updated. If the configuration of new node 268 has changed, sequence number 330 in configuration table header 315 will be incremented.

If new node 268 is not found in configuration table 310, then, a configuration table entry 370 and a publish sector 450 will be associated with (e.g., assigned to) new node 268. The publish sector 450 indicates whether the new node 268 is alive. If new node 268 later dies, the relevant configuration table entry 370 and/or publish sector 450 may be updated to indicate that new node 268 has died. In some embodiments, configuration table entries 370 are assigned to nodes 160 sequentially (e.g., the first node 160 added to the cluster file system is assigned the first configuration table entry 370, and the second node 160 in cluster file system 100 is assigned the second configuration table entry 370, etc.) In some embodiments, if a node 160 is dead or removed, the configuration data entry 370 or publish sector 450 associated with the dead node 160 may be reused by a new node 268 or another existing node 160. In other embodiments, configuration table entries 370 or publish sectors 450 that are associated with dead nodes 160 may be reused by rearranging configuration table entries 370 or publish sectors 450 so that such configuration table entries or publish sectors are associated with live nodes. This rearrangement may be facilitated by move operations. However, in other embodiments, configuration table entries 370 and/or publish sectors 450 associated with dead nodes 160 may subsist, and may be used by the associated dead node 160 if the dead node 160 becomes active (e.g., alive) again.

When a new node 268 is added to the cluster file system 100, node counter 320 in configuration table header 315 will be incremented to indicate the addition of the new node 268 to cluster file system 100. In some embodiments, sequence number 330 in configuration table header 315 will also be incremented to indicate a "version" change. Other nodes 160 in cluster file system 100, which periodically examine configuration table 310, will become aware of the addition of new node 268 and/or configuration changes when the other nodes 160 periodically examine configuration table 310. By examining configuration table entry 370, a node 160 may determine whether other nodes 160 are in cluster file system 100.

As stated above, a publish sector 450 will also be associated with new node 268. Based on the position of new node 268 entry among configuration table entries 370, the publish sector associated with new node 268 may be located. For example, if configuration data entry 378, which is the fourth entry in configuration table entries 370, is associated with new node 268, then publish sector 458, which is the fourth sector among publish sectors 450, will be associated with the new node. In the associated publish sector 450, information regarding the node state is kept. Other nodes 160, which periodically examine publish sectors 450 and configuration table header 315 will thus be able to determine that a new node 268 has been added because the configuration table header 315 would now have changed.

In an embodiment, nodes 160 periodically examine configuration table 160 to determine if a new node 268 has been added, or the configuration of other nodes 160 has been changed. If a node 160 detects that node counter 320 in configuration table 310 has been incremented, then a new node 268 has been added, and the node 160 may examine node configuration data stored in one or more configuration table entries 370 and/or publish sectors 450 to obtain configuration information regarding new node 268. If a node 160 detects that the sequence number 330 in configuration table 310 has been incremented, then the configuration of another node 160 has changed, and the node 160 can examine node configuration data stored in one or more configuration table entries 370 and/or publish sectors 450 to obtain updated configuration information regarding other nodes 160.

Volume 110 also includes other sectors, such as vote sectors 480, root internal section 485 and root 490. These sectors are used for processing and/or storing metadata, and for other functions.

Reconfiguration after the Addition of New Nodes

Figure 5:
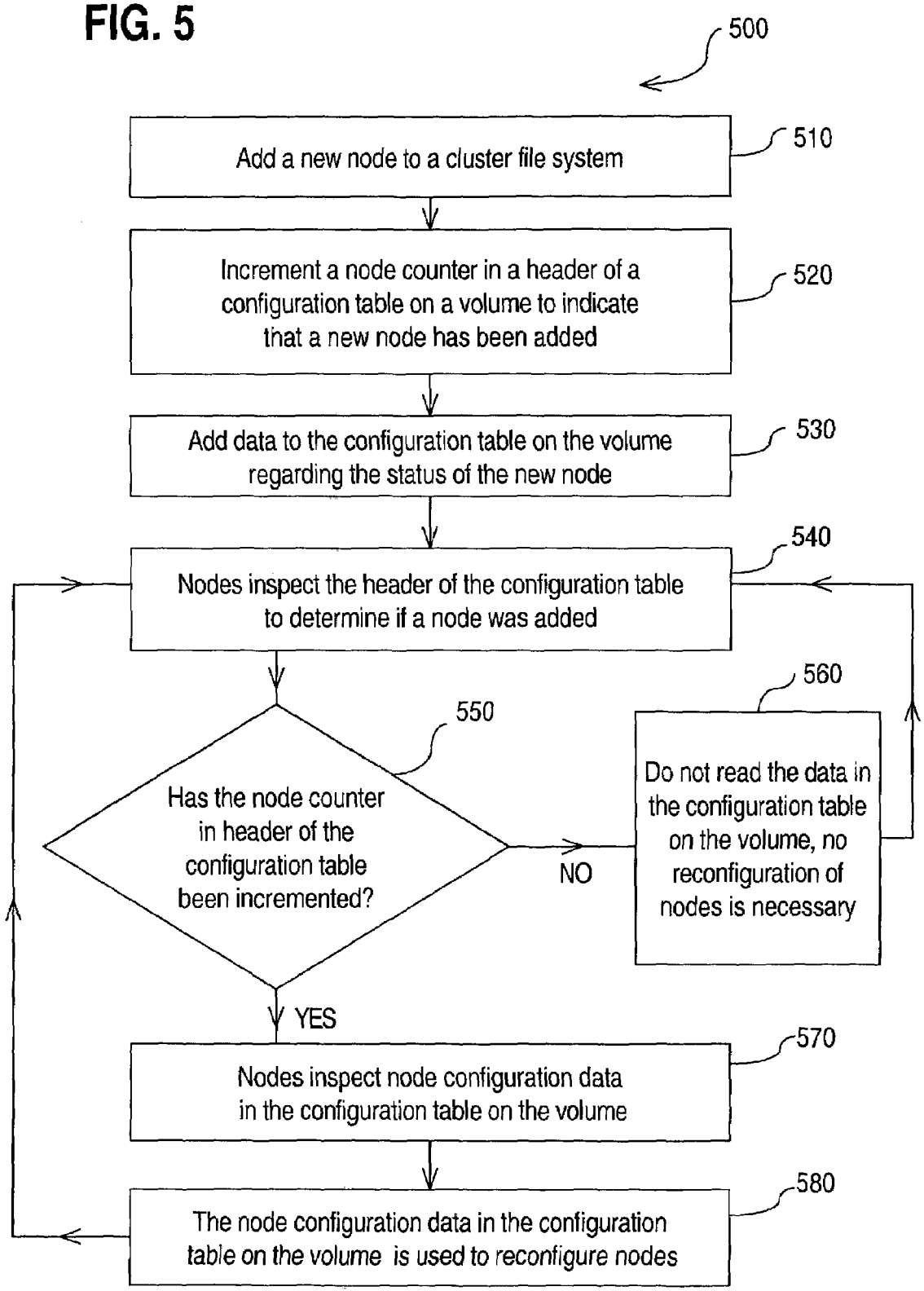
FIG. 5 is a flowchart depicting an embodiment of a method of adding a new node to a cluster file system and reconfiguring nodes to reflect the addition of the new node.

FIG. 5 is a flowchart depicting a method 500 for adding a new node 268 to cluster file system 100, and reconfiguring nodes 160 to reflect the addition of new node 268. Step 510 includes adding new node 268 to cluster file system 100. This step includes physically connecting new node 268 to certain components of cluster file system 100. New node 268 is connected to volume 110, and is also connected to other nodes 160 via interconnect(s) 195.

In an embodiment, step 510 may be preceded by a step in which configuration table 310 is searched to determine whether new node 268 is already a member of cluster file system 100. If it is determined that new node 268 is already a member of cluster file system 100, then new node 268 is not added to cluster file system 100. However, if the configuration of node 268 has changed, methods described below for updating changes to configuration of nodes 160 may be employed so that nodes 160 are reconfigured in light of the change to the configuration of new node 268.

Step 520 includes incrementing node counter 320. Node counter 320 is incremented each time a new node 268 is added to cluster system 100. As is described in further detail below, other nodes 160 periodically inspect node counter 320 to determine if any new nodes, such as new node 268, have been added.

Step 530 includes creating and/or storing data in configuration data entry 378 regarding the configuration of new node 268. Accordingly, various types of configuration data regarding new node 268, such as machine name, IP address and port information, may be stored in configuration data entry 378. As is described in further detail below, when other nodes 160 become aware that new node 268 has been added to cluster file system 100, the other nodes 160 may inspect configuration data entry 378 to identify the configuration data relating to new node 268, and, as discussed below, such configuration data may be used in the reconfiguration of other nodes 160.

Step 540 includes, as mentioned above, periodic inspection by nodes 160 of configuration table header 315 to determine if any new nodes 268 have been added to cluster file system 100. More specifically, node counter 320 in configuration table header 315 is inspected to determine (in step 550) if a new node 268 has been added. If node counter 320 has been incremented since the last time node counter 320 was inspected by a particular node, a new node 268 has been added to the cluster file system since the last time that the particular node inspected the node counter 320.

As is discussed in greater detail below, when inspecting node counter 320 in configuration table header 315, a node 160 may also inspect sequence number 330 in configuration table header 315 to determine if the configuration of any of nodes 160 has been changed. All nodes 160 may periodically inspect configuration table header 315, or certain individual nodes or groups of nodes may inspect configuration table header 315. Additionally, inspection of configuration table header 315 may be undertaken by nodes or groups of nodes, either simultaneously or non-simultaneously. The interval between inspections of configuration table header 315 may be fixed, may be programmable, or may be dynamically determined as is suitable with the specific application of the method.

Step 550 includes a determination, based on the inspection of configuration table header 315 in step 540, of whether node counter 320 has been incremented. In an embodiment, the determination of whether node counter 320 has been incremented is performed by comparing the value of node counter 320 with a previous value of node counter 320 that was stored in a particular node, or other accessible, location on a prior inspection of configuration table header 315.

As shown in step 560 in FIG. 5, if node counter 320 has not been incremented, then no new node 268 has been added to cluster file system 100. Nodes 160 then continue to periodically inspect configuration table header 315 so that if a new node 268 is eventually added to cluster file system 100, nodes 160 will learn about the addition of the new node 268.

If, in step 550, it is determined that new node 268 has been added to cluster file system 100, step 570 is performed. In this step, nodes 160 then inspect one or more configuration data entries 370 of configuration table 310 to obtain configuration information regarding new node 268, and, in embodiments, about other nodes 160. In one embodiment, upon learning that a new node has been added to cluster file system 100, a node will inspect all of the configuration data entries 370, including the configuration data entry 370 relating to the new node 268.

In step 580, the data inspected by a node in the configuration data entries 370 is used to reconfigure the node. In some contexts, by simply being aware of the configuration data of new node 268, and being able to use such configuration data in future processing or communication, a node may be considered to be reconfigured. In other contexts, reconfiguration may involve various operations, such as adjusting characteristics or parameters of a node based on the configuration data that is inspected.

Using this method, a user may simply plug a new node 268 into a disk array for a configured cluster file system 100. The volume(s) 110 in cluster file system 100 are immediately available to new node 160, and, other nodes 160 will become aware of new node 268, and will dynamically reconfigure themselves to reflect the addition of new node 268. In one aspect, the method allows nodes to determine, based on the information in configuration table 310, which other nodes belong to the cluster file system 100.

The methods noted above may be used to manage configuration changes that occur when nodes 160 are removed from cluster file system 100. For example, when a node 160 is removed, sequence number 330 may be incremented. When other nodes 160 periodically examine configuration table 310, the other nodes 160 will detect that sequence number 320 has been incremented, and will be aware that there has been a change in cluster file system 100. The other nodes 160 will examine the configuration table entries 370 and/or publish sectors 450 that are associated with other nodes 160 to obtain configuration information. The configuration information that is obtained will show that a node 160 was removed, and will reflect the configuration of other nodes 160 after the removal of the removed node 160.

The examination of configuration table 310, blank sectors 430 and 440, and publish sectors 450 may take place in a single multi-sector read. In a single read, a node 160 may obtain the values of node counter 320 and sequence number 330, and information stored in configuration table entries 370, blank sectors 430 and 440, and in public sectors 450. As such, in a single read, a node 160 may examine the configuration of all other nodes 160 in cluster file system 100.

Cluster file system 100 also includes approaches for determining whether nodes 160 are inactive. For example, cluster file system 100 may monitor the frequency with which a node 160 updates a publish sector 450. If, after a predetermined or dynamically determined duration elapses, a node 160 has not updated the relevant publish sector 450, the node will be declared inactive (i.e., dead). When a node 160 is declared inactive, a field in the in-memory map of node states that is kept by other nodes 160 will be updated to indicate that the node 160 is inactive.

An inactive node 160 may transfer to active mode. When the node 160 is made active, the publish sector 450 associated with the node 160 that has returned to active will be used to reflect any changes in the state of the node 160. Other nodes 160 will periodically read the publish sector, and thus, recognize the changes in node state from active to inactive or otherwise.

Reconfiguration after Changes in Node Configuration Data

Figure 6:
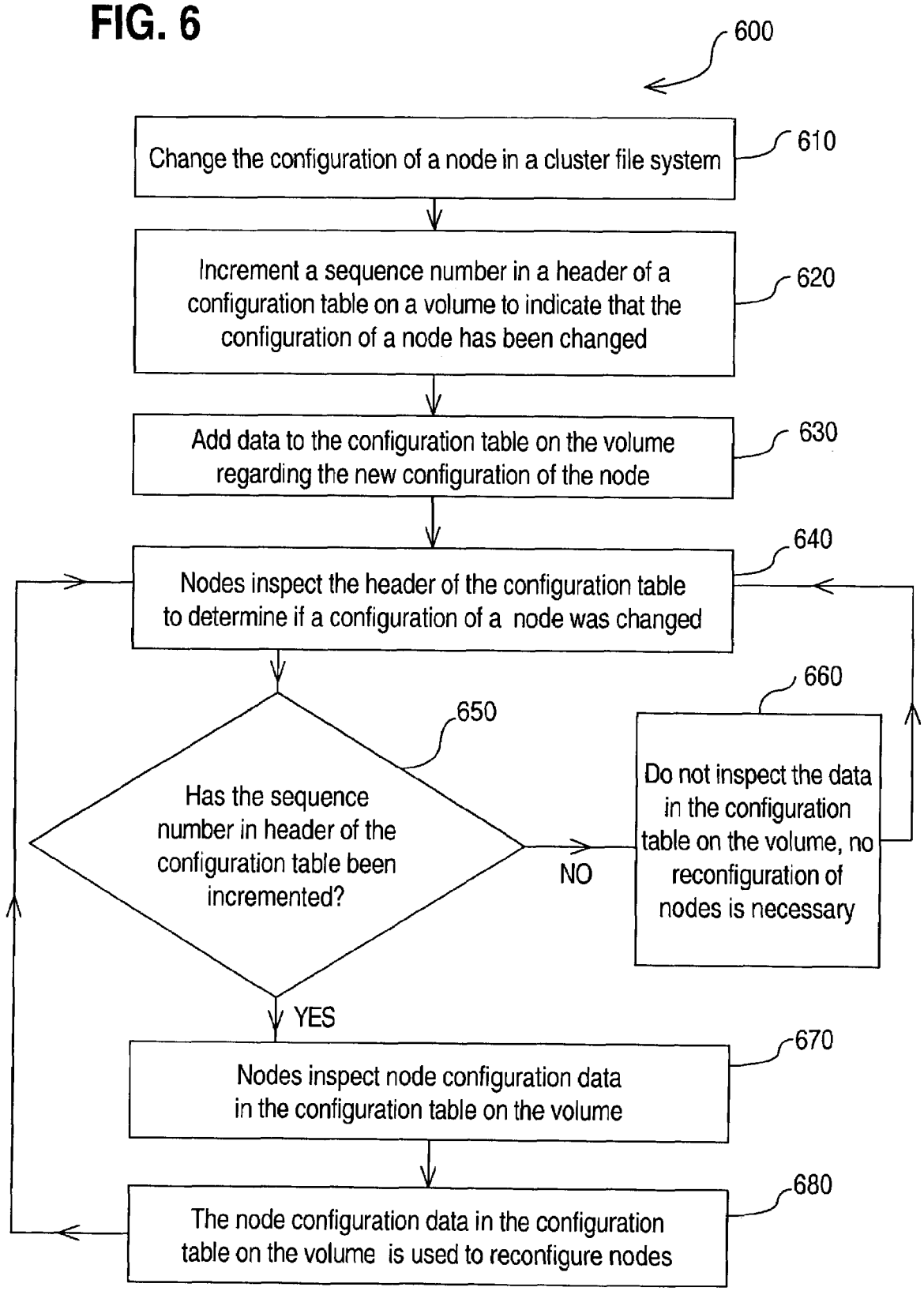
FIG. 6 is a flowchart depicting an embodiment of a method of changing the configuration of a node in a cluster file system and reconfiguring other nodes to reflect the change in the configuration of the new node.

FIG. 6 is a flowchart depicting method 600 for changing the configuration of a particular node 160 in cluster file system 100, and reconfiguring nodes 160 to reflect the new configuration the particular node 160. Step 610 includes changing the configuration of a node 160 in cluster file system 100. This step includes changing an item of configuration data, such as IP address, port information, locking information (such as information relating to distributed locking), or other information, for a node 160.

Step 620 includes incrementing sequence number 330. Sequence number 330 is incremented each time the configuration of any node 160 is changed. In some embodiments, sequence number 330 is also incremented each time a new node 268 is added or removed. As is described in further detail below, nodes 160 periodically inspect node counter 330 to determine if the configuration data of any node has been changed.

Step 630 includes updating, or storing for the first time, data in a configuration data entry 370 regarding the new configuration of a node. Accordingly, various types of configuration data may be updated in configuration data entry 370 and or publish sectors 450. As is described in further detail below, when other nodes become aware that the configuration data of a node has been changed, the other nodes may inspect one or more configuration data entries 370 and/or publish sectors 450 to identify the new configuration data. The new configuration data can be processed dynamically by other nodes in reconfiguration.

Step 640 includes, as mentioned above, periodic inspection by nodes 160 of configuration table header 315 to determine if the configuration data of any of nodes 160 has been changed. More specifically, sequence number 330 in configuration table header 315 is inspected to determine if the configuration data of any of nodes 160 has been changed. If sequence number 330 has been incremented, the configuration data of a node has been changed. As was discussed above, when inspecting sequence number 330 in configuration table header 315, a node 160 may also inspect node counter 320 in configuration table header 315, to determine if any new nodes 160 have been added to cluster file system 100. In one embodiment, only one counter is used, and, the counter is incremented both when a new node is added and when the configuration data of a node is changed. Such a counter can be inspected to determine whether nodes 160 need to be reconfigured.

Step 650 includes a determination, based on the inspection of configuration table header 315 in step 640, of whether sequence number 330 has been incremented. In an embodiment, the determination of whether sequence 330 has been incremented is performed by comparing the current value of sequence number 330 with a previous value of sequence number 330 that was stored in a particular node or in another accessible location, on a prior inspection of configuration table header 315.

As shown in step 660 in FIG. 6, if sequence number 330 has not been incremented, then there have been no changes in the configuration of nodes 160 in cluster file system 100. Nodes 160 then continue to periodically inspect configuration table header 315 so that if the configuration of a node 160 in cluster file system 100 is changed, other nodes 160 will learn about the change in configuration.

If, in step 650, it is determined that the configuration of a node 160 has been changed, step 670 is performed. In this step, nodes 160 then inspect one or more configuration data entries 370 of configuration table 310 to obtain the updated configuration data, as well as, in some embodiments, other non-updated configuration data. In one embodiment, upon learning that the configuration of a node in cluster file system 100 has changed, other nodes 160 will inspect all of the configuration data entries 370, including the configuration data entry relating to the node for which configuration data was changed.

In step 680, the configuration in the configuration data entries 370 is used to reconfigure the node. In some contexts, by simply being aware of the new configuration data, and being able to use such configuration data in future processing or communication, a node may be considered to be reconfigured. In other contexts, reconfiguration may involve various operations, such as adjusting characteristics or parameters of the node based on the configuration data that is read.

The method allows a system administrator to change configuration data, such as an IP address, for a node, without having to manually reconfigure the others of nodes 160 or take a volume 110 offline. Nodes 160 dynamically reconfigure themselves.

Figure 7:
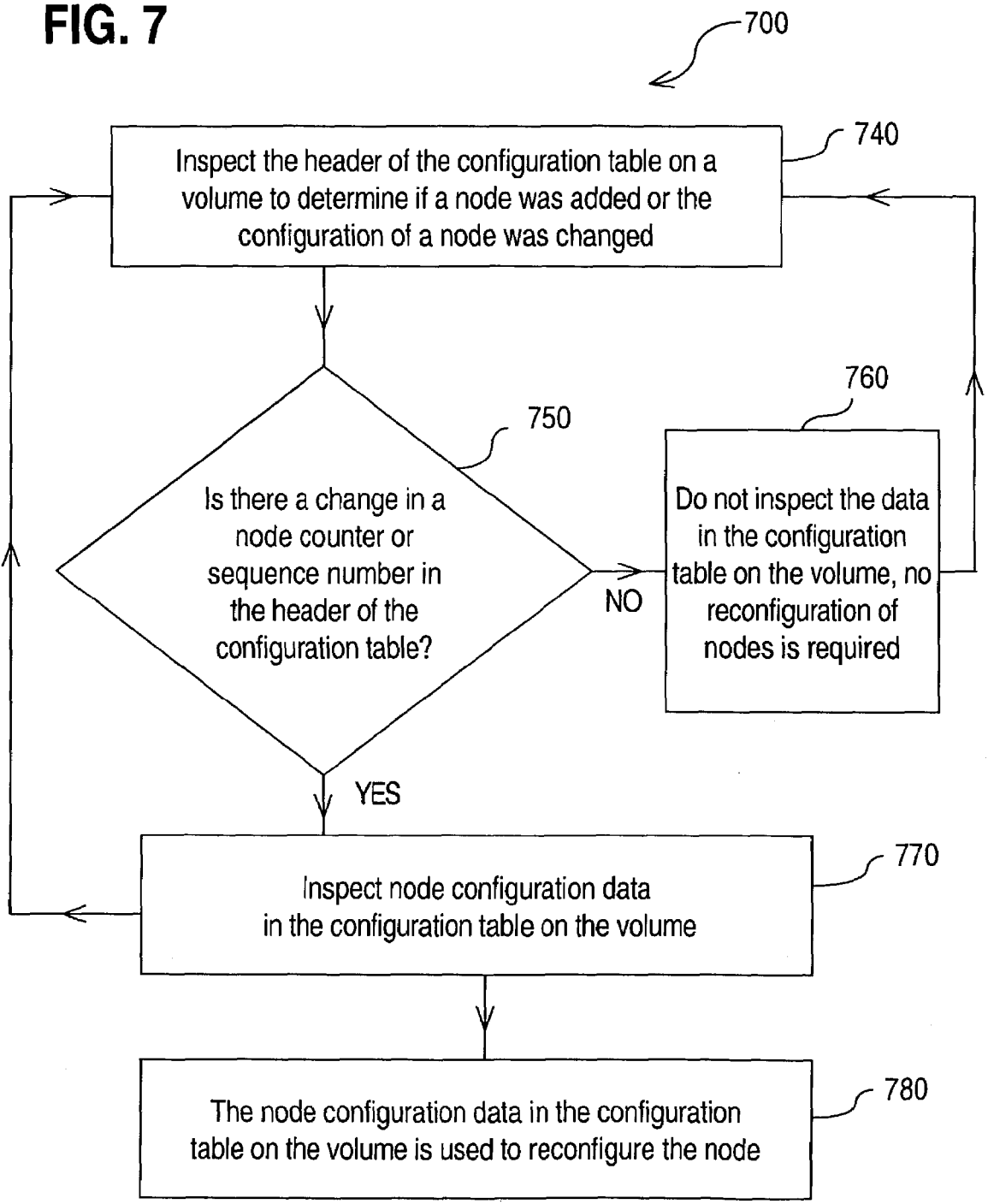
FIG. 7 is a flowchart depicting an embodiment of a method for a peer to keep abreast of changes in node configuration and the addition of nodes in a cluster file system.

FIG. 7 is a flowchart depicting a method according to which a node 160 keeps abreast of changes in node configuration and keeps abreast of the addition of other nodes 160 in a cluster file system 100. In general, steps 740-780 are analogous to steps 540-580 and steps 640-680, which are described above, respectively, in regard to FIGS. 5 and 6, and, the method provides an example in which the steps illustrated in FIGS. 5 and 6 are combined so that a node detects changes in configuration data of other nodes and also detects the addition of new nodes. Upon learning of new nodes 268 or configuration changes, a node may be reconfigured accordingly.

In one sense, at step 740, when a node inspects node counter 320 and sequence number 330 in configuration table header 315, the node may be considered to be inspecting a first item of configuration data. If the node then inspects node configuration data entries 370, the node may be considered to be inspecting a second item of configuration data. Thus, nodes 160 monitor a first item of configuration data, and, if that first item of configuration data indicates that the configuration of nodes in a cluster file system 100 has changed, or indicates that a new node 268 has been added or, nodes 160 may inspect a second item of configuration data and the second item of configuration data may be used in the reconfiguration of the nodes 160.

Because cluster file system 100 is a fairly low level in a computer system, other network or system components are capable of dynamically adding and removing nodes 160 from cluster file system 100 in a relatively expedient manner. Additionally, nodes 160 could be added or removed in respect of the particular perspective of a specific component. In other words, the certain nodes 160 may be "carved out" or partitioned off, and their presence will only be detected by a particular component or set of components. Using this approach a cluster file system 100 may be divided into a number of "logical" clusters.

Locking Mechanism

In one implementation of the methods disclosed above, a locking mechanism is employed to improve integrity in the configuration of nodes 160. When adding a new node 268 to cluster file system 100, if no other node 160 is currently alive, new node 268 writes configuration information for new node 268 to configuration table 310. The locking mechanism includes the use of a scratch sector.

Once new node 268 obtains the lock, new node 268 will maintain the lock until new node 268 completes its update. Other nodes 160 that are attempting to add themselves to configuration table 310 will not be added until the lock is no longer maintained by node 268. When it is added, new node 268 adds a node name that is a unique identity in cluster file system 100 to the configuration table 310. New node 268 may also add a number of interconnect addresses and any other information that new node 268 deems appropriate to communicate to other nodes 160 in cluster file system 100. It also updates node counter 320 and, in some embodiments, sequence number 330 in configuration table header 315.

If new node 268 is added, and other nodes are alive, new node 268 adds itself to configuration table 310 as described above. The other live nodes 160 in cluster file system 100, periodically inspect the configuration table header 315. If either node counter 320 or sequence number 330 changes, new node 268 will reread configuration table 310 and reconfigure its notion of what the cluster file system 100 looks like.

Hardware Overview

The approach for reconfiguring nodes described herein may be implemented in a variety of ways and the invention is not limited to any particular implementation. The approach may be integrated into a computer system or a network device, or may be implemented as a stand-alone mechanism. Furthermore, the approach may be implemented in computer software, hardware, or a combination thereof.

Figure 8:
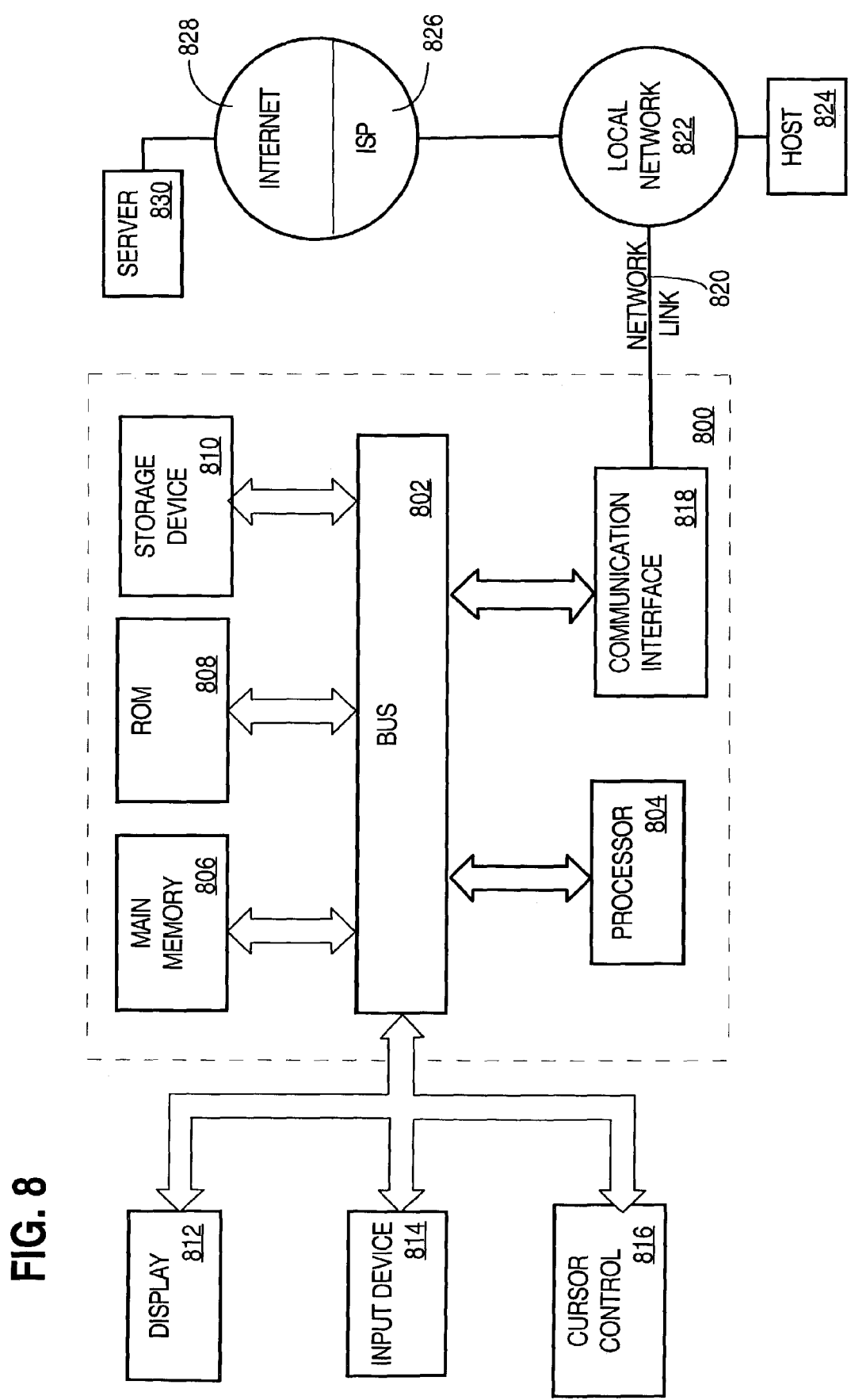
FIG. 8 is a block diagram depicting an embodiment of a system upon which embodiments of the disclosed approaches may be implemented.

FIG. 8 is a block diagram that depicts a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, computer-readable storage medium for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge; and transmission media. for example a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of configuring a plurality of nodes in a cluster file system, the method comprising:
    maintaining, in a configuration repository accessible to said plurality of nodes, configuration data for each of the plurality of nodes;
    wherein said configuration data includes data indicating that said plurality of nodes are members of said cluster file system; and
    wherein nodes that belong to said cluster file system determine which other nodes belong to the cluster file system based on information in said configuration repository;
    at a node that belongs to the cluster file system,
        in response to passage of a particular interval of time, reading said configuration data to determine whether a change has occurred to the configuration data; and
        in response to detecting a change to said configuration data, said node automatically reconfiguring itself based on said change to said configuration data.

2. The method recited in claim 1, further comprising each of the plurality of nodes inspecting the configuration data in said configuration repository to identify the configuration data of others of the plurality of nodes.

3. The method recited in claim 1, wherein the particular interval of time is programmable.

4. The method recited in claim 1, wherein the particular interval of time is fixed.

5. The method recited in claim 1, further comprising, in response to a change in any node of said plurality of nodes from a first configuration to a second configuration, updating the configuration data in the configuration repository so that the configuration data reflects the second configuration of said any node.

6. The method recited in claim 5, further comprising all nodes in the plurality of nodes other than said any node inspecting the configuration data to identify the second configuration of said any node.

7. The method recited in claim 6, wherein the step of inspecting includes causing each node in said all nodes in the plurality of nodes other than said any node to inspect the configuration data in the configuration repository in response to said passage of said particular interval of time.

8. The method recited in claim 7, wherein the particular interval of time is fixed.

9. The method recited in claim 1, further comprising, upon an addition of a new node to the cluster file system, updating the configuration data in the configuration repository to cause the configuration data to reflect the presence and configuration of the new node.

10. The method recited in claim 9, further comprising at least one of the plurality of nodes inspecting the configuration data in the configuration repository to identify the presence and configuration of the new node.

11. The method recited in claim 10, wherein the step of inspecting includes causing the at least one of said plurality of nodes to inspect the configuration data in the configuration repository in response to the passage of a particular interval of time.

12. The method recited in claim 11, wherein the particular interval of time is fixed.

13. The method recited in claim 1, wherein said configuration repository is a configuration table on a volume.

14. The method recited in claim 1, wherein said configuration repository includes a first item of data,
    the method further comprising the step of altering said first item of data upon the addition of a new node to the cluster file system.

15. The method recited in claim 14, further comprising:
    at least one node of said plurality of nodes inspecting the first item of data to determine whether a new node has been added to the cluster file system; and
        if it is determined that a new node has been added to the cluster file system, the at least one node of said plurality of nodes inspecting a second item of data in the configuration repository.

16. The method recited in claim 15, further comprising:
    the at least one node of said plurality of nodes reconfiguring itself based on said second item of data.

17. The method recited in claim 15, wherein said step of inspecting comprises a first step of inspecting a sequence number, the method further comprising determining, based on the first step of inspecting, if the configuration of a node has been changed.

18. The method recited in claim 15, wherein the first item of data is a node counter.

19. The method recited in claim 1, wherein said configuration repository includes a first item of data, the method further comprising the step of altering said first item of data upon a change in the configuration of a node in the cluster file system.

20. The method recited in claim 19, further comprising:

at least one node of said plurality of nodes inspecting the first item of data to determine whether the configuration of a node has been changed in the cluster file system; and if it is determined that the configuration of a node has been changed in the cluster file system, the at least one node of said plurality of nodes inspecting a second item of data in the configuration repository.

21. The method recited in claim 20, further comprising:

the at least one node of said plurality of nodes reconfiguring itself based on said second item of data.

22. The method recited in claim 20, wherein the first item of data is a sequence number.

23. The method of claim 1, further comprising:

adding a new node to the cluster file system; and updating the configuration repository to reflect the presence and configuration of the new node.

24. The method recited in claim 23, wherein one or more nodes other than the new node are in the cluster file system and are connected to the configuration repository, the method further comprising said one or more nodes inspecting configuration data in the configuration repository to identify the configuration of nodes, including the new node.

25. The method recited in claim 23, further comprising, prior to adding the new node to the cluster file system, inspecting data in the configuration repository to determine whether the new node is already a member of the cluster file system, and if the node is already a member of the cluster file system, updating configuration data in the configuration repository regarding the new node.

26. The method recited in claim 24, wherein the step of inspecting comprises a first step of inspecting a first item of data in the configuration repository;

if it is determined, based on the first item of data, that a new node has been added, inspecting a second item of data in the configuration repository that relates to the new node; and based on the second item of data, reconfiguring at least one or more nodes other than the new node.

27. The method of claim 26, wherein the configuration repository remains online throughout the course of reconfiguring the at least one or more node other than the new node.

28. The method of claim 26, wherein reconfiguration is automatic, and no manual reconfiguration of any of the at least one or more nodes is required.

29. A method for a node in a cluster file system to reconfigure itself comprising:

in response to passage of a particular interval of time, inspecting first data in a configuration repository for a cluster file system;

based on said inspecting, determining that a new node was added to the cluster file system; and in response to determining that a new node was added to the cluster file system, performing the steps of:

inspecting second data in the configuration repository regarding the configuration of the new node; and automatically reconfiguring the node to reflect the addition of the new node.

30. A method for a node in a cluster file system to reconfigure itself comprising:

in response to passage of a particular interval of time, inspecting first data in a configuration repository for a cluster file system;

based on said inspecting, determining that the configuration of another node in the cluster file system was changed; and in response to determining that the configuration of another node in the cluster file system was changed, performing the steps of:

inspecting second data in the configuration repository regarding the new configuration of the other node; and automatically reconfiguring the node to reflect the new configuration of the other node.

31. A system comprising:

a configuration repository;

one or more nodes, wherein each node of the one or more nodes is connected to the configuration repository;

wherein configuration data regarding configuration of the one or more nodes is stored on the configuration repository;

wherein each of said one or more nodes is configured to inspect the configuration data in response to passage of a particular interval of time to determine whether a change has occurred to the configuration data relating to another node in the cluster; and wherein each of said one or more nodes is configured to automatically reconfigure itself in response to determining that a change has occurred to the configuration data relating to another node in the cluster.

32. The system of claim 31, wherein each of said one or more nodes is further configured to update the configuration repository upon addition of the each of said one or more nodes to the cluster file system.

33. The system of claim 31, wherein at least one of said one or more nodes is further configured to update configuration data in the configuration repository in response to a change in the configuration.

34. A computer-readable storage medium carrying one or more sequences of instructions which, when executed by one or more processors, causes the one or more processors to perform the steps of:

maintaining, in a configuration repository accessible to said plurality of nodes, configuration data for each of the plurality of nodes;

wherein said configuration data includes data indicating that said plurality of nodes are members of said cluster file system; and wherein nodes that belong to said cluster file system determine which other nodes belong to the cluster file system based on information in said configuration repository;

at a node that belongs to the cluster file system, in response to passage of a particular interval of time, reading said configuration data to determine whether a change has occurred to the configuration data; and in response to detecting a change to said configuration data, said node automatically reconfiguring itself based on said change to said configuration data.

35. The computer-readable storage of claim 34, wherein the instructions further comprise instructions for each of the plurality of nodes inspecting the configuration data in said configuration repository to identify the configuration data of others of the plurality of nodes.

36. The computer-readable storage medium of claim 34, wherein the particular interval of time is programmable.

37. The computer-readable storage medium of claim 34, wherein the particular interval of time is fixed.

38. The computer-readable storage medium of claim 34, further comprising instructions for:
   in response to a change in any node of said plurality of nodes from a first configuration to a second configuration, updating the configuration data in the configuration repository so that the configuration data reflects the second configuration of said any node.

39. The computer-readable storage medium of claim 38, further comprising instructions for all nodes in the plurality of nodes other than said any node inspecting the configuration data to identify the second configuration of said any node.

40. The computer-readable storage medium of claim 39, wherein the instructions for inspecting include instructions for causing each node in said all nodes in the plurality of nodes other than said any node to inspect the configuration data in the configuration repository in response to said passage of said particular interval of time.

41. The computer-readable storage medium of claim 40, wherein the particular interval of time is fixed.

42. The computer-readable storage medium of claim 34, further comprising instructions for:
   upon an addition of a new node to the cluster file system, updating the configuration data in the configuration repository to cause the configuration data to reflect the presence and configuration of the new node.

43. The computer-readable storage medium of claim 42, further comprising instructions for:
   at least one of the plurality of nodes inspecting the configuration data in the configuration repository to identify the presence and configuration of the new node.

44. The computer-readable storage medium of claim 43, wherein the instructions for inspecting include instructions for causing the at least one of said plurality of nodes to inspect the configuration data in the configuration repository in response to the passage of a particular interval of time.

45. The computer-readable storage medium of claim 44, wherein the particular interval of time is fixed.

46. The computer-readable storage medium of claim 34, wherein said configuration repository is a configuration table on a volume.

47. The computer-readable storage medium of claim 34, wherein:
   said configuration repository includes a first item of data; and
   the instructions further comprise instructions for altering said first item of data upon the addition of a new node to the cluster file system.

48. The computer-readable storage medium of claim 47, further comprising instructions for:
   at least one node of said plurality of nodes inspecting the first item of data to determine whether a new node has been added to the cluster file system; and
   if it is determined that a new node has been added to the cluster file system, the at least one node of said plurality of nodes inspecting a second item of data in the configuration repository.

49. The computer-readable storage medium of claim 48, further comprising instructions for:
   the at least one node of said plurality of nodes reconfiguring itself based on said second item of data.

50. The computer-readable storage medium of claim 48, wherein:
   the instructions for inspecting comprises instructions for inspecting a sequence number; and
   the instructions further comprise instructions for determining, based on inspecting the sequence number, if the configuration of a node has been changed.

51. The computer-readable storage medium of claim 48, wherein the first item of data is a node counter.

52. The computer-readable storage of claim 34, wherein:
   said configuration repository includes a first item of data; and
   the instructions further comprise instructions for altering said first item of data upon a change in the configuration of a node in the cluster file system.

53. The computer-readable storage medium of claim 52, further comprising instructions for:
   at least one node of said plurality of nodes inspecting the first item of data to determine whether the configuration of a node has been changed in the cluster file system; and
   if it is determined that the configuration of a node has been changed in the cluster file system, the at least one node of said plurality of nodes inspecting a second item of data in the configuration repository.

54. The computer-readable storage medium of claim 53, further comprising instructions for:
   the at least one node of said plurality of nodes reconfiguring itself based on said second item of data.

55. The computer-readable storage medium of claim 53, wherein the first item of data is a sequence number.

56. The computer-readable storage medium of claim 34, further comprising instructions for:
   adding a new node to the cluster file system; and
   updating the configuration repository to reflect the presence and configuration of the new node.

57. The computer-readable storage medium of claim 56, wherein:
   one or more nodes other than the new node are in the cluster file system and are connected to the configuration repository; and
   the instructions further comprises instructions for said one or more nodes inspecting configuration data in the configuration repository to identify the configuration of nodes, including the new node.

58. The computer-readable storage medium of claim 56, further comprising instructions for:
   prior to adding the new node to the cluster file system, inspecting data in the configuration repository to determine whether the new node is already a member of the cluster file system, and
   if the node is already a member of the cluster file system, updating configuration data in the configuration repository regarding the new node.

59. The computer-readable storage medium of claim 57, wherein the instructions for inspecting comprises instructions for:
   inspecting a first item of data in the configuration repository;

if it is determined, based on the first item of data, that a new node has been added, inspecting a second item of data in the configuration repository that relates to the new node; and based on the second item of data, reconfiguring at least one or more nodes other than the new node.

60. The computer-readable storage medium of claim 59, wherein the configuration repository remains online throughout the course of reconfiguring the at least one or more node other than the new node.

61. The computer-readable storage medium of claim 59, wherein reconfiguration is automatic, and no manual reconfiguration of any of she at least one or more nodes is required.

62. A computer-readable storage medium carrying one or more sequences of instructions which, when executed by one or more processors, causes the one or more processors to perform the steps of:

in response to passage of a particular interval of time, inspecting first data in a configuration repository for a cluster file system;

based on said inspecting, determining that a new node was added to the cluster file system; and in response to determining that a new node was added to the cluster file system, performing the steps of:

inspecting second data in the configuration repository regarding the configuration of the new node; and automatically reconfiguring the node to reflect the addition of the new node.

63. A computer-readable storage medium carrying one or more sequences of instructions which, when executed by one or more processors, causes the one or more processors to perform the steps of:

in response to passage of a particular interval of time, inspecting first data in a configuration repository for a cluster file system;

based on said inspecting, determining that the configuration of another node in the cluster file system was changed; and in response to determining that the configuration of another node in the cluster file system was changed, performing the steps of:

inspecting second data in the configuration repository regarding the new configuration of the other node; and automatically reconfiguring the node to reflect the new configuration of the other node.

* * * * *